Dec. 12, 1961  C. P. HELIN  3,012,357
FISH LURES
Filed March 5, 1956
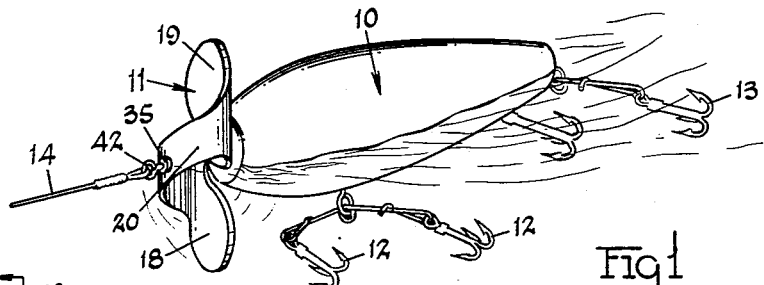
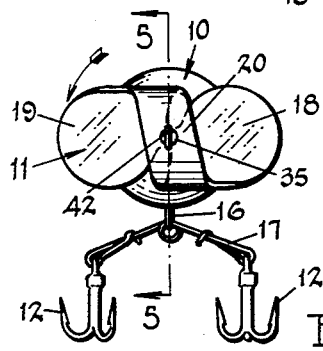
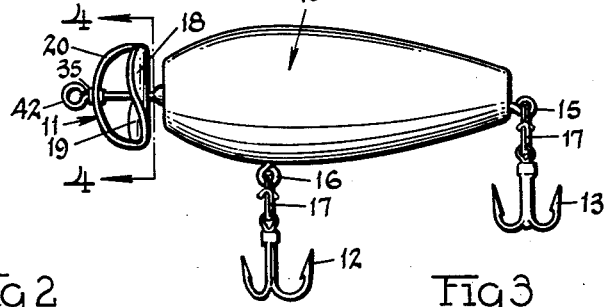
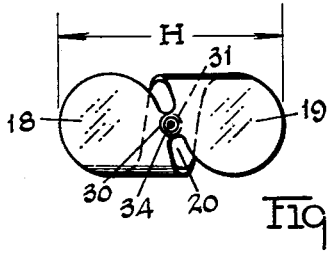
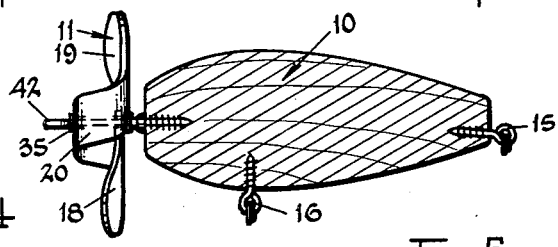
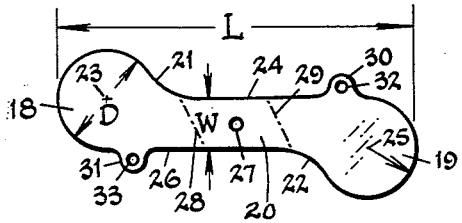
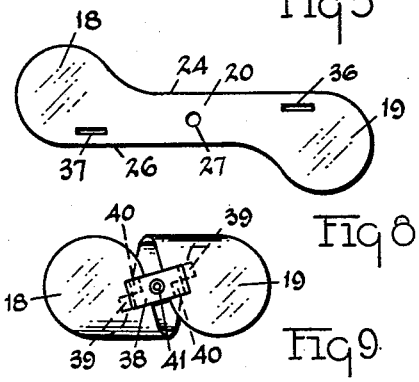
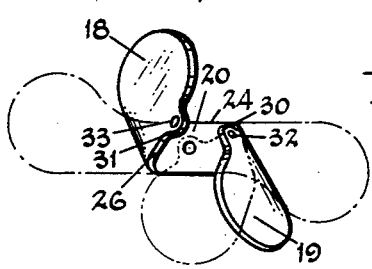
Inventor
CHARLES P. HELIN
By Barnes, Kisselle, Laughlin & Raisch
Attorneys United States Patent Office
3,012,357
Patented Dec. 12, 1961

3,012,357
FISH LURES
Charles P. Helin, 4099 Beaufait,
Grosse Pointe Park, Mich.
Filed Mar. 5, 1956, Ser. No. 569,423
6 Claims. (Cl. 43—42.17)

This invention relates to fish lures and particularly to fish lures adapted to be used along the surface of the water.

In order to be effective in catching fish, a fish lure for use on the surface of the water should be lifelike, that is, it should simulate a live action as it is pulled along the water. The lure is more effective if it produces bubbles and sounds which will tend to attract fish. It has heretofore been suggested that a lure for use on the surface of the water might be more effective if it utilizes a rotary blade. Such lures have been partially successful but are not as effective as is desired.

It is an object of this invention to provide a fish lure for use on the surface of the water which produces a lifelike action as it is moved along the water.

It is a further object of this invention to provide such a fish lure which produces bubbles as it is moved along the water.

It is a further object of this invention to provide such a fish lure which produces sounds which will attract fish as it is pulled along the water.

It is a further object of this invention to provide such a fish lure which may be easily and economically manufactured.

It is a further object of this invention to provide such a fish lure which will withstand the normal handling incident to its being used for catching fish.

In the drawings:

FIG. 1 is a perspective view of the fish lure in use on the surface of the water.

FIG. 2 is an end elevational view of the fish lure.

FIG. 3 is a side elevational view of the fish lure.

FIG. 4 is a sectional view taken along the line 4—4 in FIG. 3.

FIG. 5 is a part sectional view taken along the line 5—5 in FIG. 2.

FIG. 6 is a plan view of the blank from which the spinner of the lure is formed.

FIG. 7 is a plan view of the spinner as it is being formed from the blank, the dotted lines representing several positions of various portions of the blank as it is being formed.

FIG. 8 is a plan view of a modified form of the blank from which the spinner of the lure is formed.

FIG. 9 is a view of the fish lure, similar to FIG. 4, embodying the spinner made from the blank shown in FIG. 8.

Referring to FIG. 1, the fish lure comprises a body 10 of buoyant material such as wood or plastic, a rotary blade or spinner 11 mounted for rotation at the front end of body 10 and hooks 12 and 13 suspended from body 10. As further shown in FIG. 1, the lure is adapted to be pulled along the surface of the water by a line 14.

Body 10 is made of a buoyant material such that about one-half thereof is submerged. Body 10 is preferably ellipsoidal or generally sausage shaped in order to facilitate its movement through the water. It may be painted to simulate various types of fish, as is well known in the art.

Hooks 12, 13 may be suspended from body 10 in any well-known manner, for example, by means of pins 15, 16 fastened to body 10 and each formed with an eye on one end thereof. As shown in FIG. 2, hooks 12 may be fastened to pin 16 by means of a wire 17 looped through the eye of pin 16 and having hooks 12 suspended therefrom by bending the ends thereof through the hooks. In a similar fashion, hooks 13 may be suspended from the eye of pin 15. Pin 15 is preferably positioned at the rear end of body 10 and a little below the center thereof while pin 16 is positioned intermediate the ends of body 10 and toward the front end thereof.

Spinner 11 is formed from a blank of thin material such as sheet metal, as shown in FIG. 6. The blank comprises enlarged ends or blades 18, 19 connected by an elongated central portion 20. As shown in FIG. 6, blades 18, 19 are generally positioned on either side of the longitudinal axis of central portion 20. Blades 18, 19 are preferably circular in shape while the central portion 20 is generally rectangular, with blades 18, 19 connected to central portion 20 by fillets 21, 22. The radius of curvature of the fillets 21, 22 is greater than the radius of the blades 18, 19.

As further shown in FIG. 6, the center of curvature 23 of circular blade 18 lies along a line which extends along the edge 24 of central portion 20 while the center of curvature 25 of blade 19 lies along a line which extends along the edge 26 of central portion 20. Since blades 18, 19 have substantially the same radius of curvature, the edge 24 is tangent to the edge of blade 19 while the edge 26 is tangent to the edge of blade 18. The blank is also formed with a small opening 27 at the center thereof which serves as a bearing point as presently described.

The blank is bent to form the spinner by gradual bending along the lines 28, 29, shown in FIG. 6. The lines 28, 29 extend transversely of the longitudinal axis of central portion 20 and at a small angle to the perpendicular to the longitudinal axis. As shown in FIG. 7, blade 18 is folded along the line 28 while blade 19 is folded along the line 29 bringing a portion of the edge 24 which is adjacent blade 19 into parallel relationship with a portion of the edge 26 which is adjacent blade 18.

Blades 18 and 19 are maintained in the bent position by means of tabs 30 and 31. Tabs 30 and 31 are formed integral with the blank along the edges 24 and 26, respectively. Tabs 30, 31 are positioned inwardly of the centers 25, 23 of curvature of the blades 18, 19 toward the center of the blank (FIG. 6). When blades 18, 19 are bent into position, tabs 30, 31 are brought into overlapping relationship, bringing holes 32, 33 therein into alignment. An eyelet 34 is then inserted through the holes 32, 33 to maintain the blades 18, 19 in the bent position.

After the blank has been bent and eyelet 34 is inserted, blades 18, 19 are bent slightly to provide a pitch thereto (FIGS. 3, 5). In this position blades 18, 19 form the vanes of the spinner. The central portion 20 connects the blades and passes out of the plane of the blades with an arcuate configuration, as shown in FIG. 3. The central portion 20 is thereby spaced from the plane of blades 18, 19. The centers 23, 25 of the radii of curvature of blades 18, 19 lie on a radial line of the spinner.

The spinner is mounted on the front end of body 10 by means of a pin 42 extending through the opening 27 in the section 20 and through aligned openings 32, 33 in tabs 30, 31. An eyelet 35 may be provided in the opening 27 to serve as a bearing in the same manner as eyelet 34 in tabs 30, 31. By this arrangement, the spinner is supported on the pin 42 at two axially spaced points which provides additional strength to the spinner. The end of the pin 42 may be formed with an eye to which the fish line 14 may be attached.

When the fish lure is pulled through the water by the line 14, spinner 11 is caused to rotate in a counterclockwise direction, as shown in FIG. 2. The shape of body 10 and the distribution of its weight is such that the lure floats in the water with the orbit of rotation of the spinner 11 generally perpendicular to the surface of the water and projecting partially above and partially below the surface of the water. The movement of the fish lure as it is pulled through the water causes bubbles to form and produces a gurgling or lifelike sound resulting in a live action which effectively attracts fish. I have found that the action of the fish lure is such that fish are readily attracted.

Although I do not wish to be bound by the theory involved, it is my opinion that the bubbles and sounds are produced by the particular movement of the water caused by the blades 18, 19 and the central arcuate portion 20 which is displaced out of the plane of the blades. I believe that this action is caused by the arcuate portion 20 carrying water upwardly out of the surface of the water. This water which is carried up by the arcuate portion 20 is deflected by the blades 18 and 19. The streamlined shape of the body 10 combined with the spinner 11 provides a lure which has no right angle projections and therefore may be easily pulled through the water and the course thereof may be changed either gradually or rapidly without interfering with the action of the fish lure.

I have found that best results are achieved where the diameter D of the blades is equal to twice the width W of the central portion 20. In addition, it is preferred that the length L of the blank be equal to eight times the width W of the central portion 20. The length of the spinner H, after the blank has been bent to form the spinner, is preferably 5.4 times the width of the central portion 20.

An example of a spinner which I have found to produce satisfactory results has the following dimensions:

|  | Inches |
|---|---|
| Overall length | 2 1/16 |
| Diameter of body | .959 |
| Thickness of spinner material | .025 |
| H | 1 9/16 |
| L | 2 1/2 |
| D | 5/8 |
| W | 5/16 |

A modified form of blank from which the spinner of the lure may be formed is shown in FIG. 8. This blank is identical to that shown in FIG. 6 except that tabs 30 and 31 are omitted and slots 36, 37 are provided in the body of the spinner in the same general position adjacent edges 24, 26, respectively. The blank is bent in the same manner as that shown in FIG. 6, bringing a portion of edge 24 which is adjacent blade 19 into parallel relationship with a portion of the edge 26 which is adjacent blade 18. In this form, blades 18 and 19 are maintained in the bent position by means of a short piece 38 which is connected between blades 18 and 19. As shown in FIG. 9, piece 38 is fastened to blades 18, 19, for example, by splitting the ends thereof to form tabs 39, 40 which are passed through slots 36, 37 and bent over. Pieces 38 may also be attached to blades 18, 19 by soldering, welding or in any other suitable manner. Opening 41 is provided in piece 38 for mounting the spinner on the pin 42 on the front end of body 10. The operation of this form of fish lure is substantially the same as that for the form shown in FIGS. 1 through 7.

I claim:

1. A blank for a fish lure spinner comprising a flat sheet including generally circular blades connected by a central elongated portion having substantially straight parallel edges, said central elongated portion having a width substantially equal to the radius of each said circular blade, the center of the radius of curvature of one said blade lying on a line which forms an extension of one edge of said central elongated portion and the center of the radius of curvature of the other said blade lying along a line which forms an extension of the other edge of said central elongated portion.

2. The blank set forth in claim 1 wherein the length of said blank is equal to approximately eight times the width of said central elongated portion.

3. The blank set forth in claim 1 including a tab extending outwardly from the juncture of said one edge of said central elongated portion and the peripheral edge of the other said blade, and a tab extending outwardly from the juncture of said other edge of said central elongated portion and the periphery of said one blade, each tab having a hole therein, said central elongated portion having an opening therein at the center thereof.

4. In a fish lure comprising a buoyant body and a spinner, the combination wherein said spinner has a pair of radially extending blades, means connecting the blades and forming a bearing opening, a shaft mounted on one end of said body generally axially thereof and extending through said bearing opening, said blades lying in a substantially common plane and having a pitch such that the spinner is rotated when the lure is pulled along the surface of the water in a direction substantially parallel to the axis of said shaft, said spinner also including a pair of surfaces spaced from the axis of the bearing opening and disposed symmetrically with respect to a transverse radial line through the centers of said blades, one said surface extending from one side edge of one of the blades and the other said surface extending from the opposite side edge of the other of said blades, each said surface extending away from the general plane of the blades toward the direction of movement of the lure through the water and facing generally inwardly toward said shaft, the maximum distance between said surfaces being substantially equal to the length of one of said blades and the width of said surfaces being substantially equal to at least one-half the width of one of said blades, the length of said spinner being substantially equal to about several times the width of one of said blades.

5. In a fish lure comprising a buoyant body and a spinner, the combination wherein said spinner comprises a pair of radially extending blades, means connecting the blades and forming a bearing opening, a shaft extending through said bearing opening, said blades lying in a substantially common plane and having a pitch such that the spinner is rotated when the lure is pulled along the water in a direction parallel to the axis of said shaft, said spinner having a continuous portion of substantially uniform width extending from one side of one said blade to the opposite side of the other said blade, said portion defining an open-ended passageway having its axis generally parallel to a radial line through said blades, said passageway having a width generally equal to the width of one of said blades measured in a direction transversely of a radial line through the centers of said blades and generally equal to the length of one of said blades, said continuous portion having a width substantially equal to at least one-half the width of one of the blades measured in a direction transversely of a radial line through the centers of said blades, the length of said spinner being substantially equal to about several times the width of one of said blades.

6. In a fish lure comprising a buoyant body and a spinner, the combination wherein said spinner is made in one piece and comprises a pair of radially extending circular blades in closely adjacent relationship, means connecting the blades and forming a bearing opening, a shaft extending through the bearing opening, said blades lying in a substantially common plane and having a pitch such that the spinner is rotated when the lure is pulled along the water in a direction parallel to the axis of said bearing opening, said spinner having an integral continuous portion of substantially uniform width extending from one side of one said blade to the opposite side of the other said blade away from the general plane of rotation of the spinner toward the direction of movement of the lure through the water, said continuous portion being curved in a plane generally transverse to a radial line through said blades and thereby defining an open-ended passageway having its axis generally parallel to said radial line, the width of said passageway measured in an axial plane at a right angle to said radial line being substantially equal to the diameter of said blades, said continuous portion having a width at least equal to the radius of one of said blades, said continuous portion of said spinner having a bearing opening therein in alignment with said bearing opening in said means connecting the blades, the length of said spinner being substantially equal to about several times the diameter of one of said blades.

References Cited in the file of this patent

UNITED STATES PATENTS

| | | |
|---|---|---|
| 1,007,007 | Pflueger | Oct. 24, 1911 |
| 1,265,900 | Foss | May 14, 1918 |
| 1,443,585 | Mitchell et al. | Jan. 30, 1923 |
| 1,521,090 | Goble | Dec. 30, 1924 |
| 1,639,943 | Heberling | Aug. 23, 1927 |
| 1,758,344 | Wright | May 13, 1930 |
| 1,812,782 | Gluck | June 30, 1931 |
| 2,551,127 | Hesse | May 1, 1951 |
| 2,626,478 | Folmer | Jan. 27, 1953 |

FOREIGN PATENTS

| | | |
|---|---|---|
| 421,046 | Italy | 1947 |
| 465,459 | Canada | May 30, 1950 |
| 1,036,882 | France | 1953 |